(12) United States Patent
Lampe et al.

(10) Patent No.: US 9,102,876 B2
(45) Date of Patent: Aug. 11, 2015

(54) DEVICE AND METHOD FOR THE DRYING AND TORREFACTION OF AT LEAST ONE CARBON-CONTAINING MATERIAL FLOW IN A MULTIPLE HEARTH FURNACE

(75) Inventors: Karl Lampe, Ennigerloh (DE); Jürgen Denker, Beckum (DE); Christoph Beyer, Münster (DE); Richard Erpelding, Soest (DE)

(73) Assignee: ThyssenKrupp Industrial Solutions AG (DE)

( * ) Notice: Subject to any disclaimer, the term of this patent is extended or adjusted under 35 U.S.C. 154(b) by 650 days.

(21) Appl. No.: 13/390,273

(22) PCT Filed: Jul. 15, 2011

(86) PCT No.: PCT/EP2011/062131
§ 371 (c)(1),
(2), (4) Date: Feb. 13, 2012

(87) PCT Pub. No.: WO2012/007574
PCT Pub. Date: Jan. 19, 2012

(65) Prior Publication Data
US 2012/0137538 A1    Jun. 7, 2012

(30) Foreign Application Priority Data
Jul. 15, 2010   (DE) .......................... 10 2010 036 425

(51) Int. Cl.
*C10B 49/02*  (2006.01)
*C10B 53/02*  (2006.01)
*C10B 7/02*   (2006.01)
(Continued)

(52) U.S. Cl.
CPC . *C10B 49/02* (2013.01); *C10B 7/02* (2013.01); *C10B 53/02* (2013.01); *C10L 5/40* (2013.01);
(Continued)

(58) Field of Classification Search
CPC ........... C10L 9/083; C10L 5/40; C10L 9/093; C10B 49/02; C10B 53/02; C10B 7/02; F26B 17/003; F26B 21/04; F26B 21/14; F26B 23/022; F26B 2200/02; Y02E 50/14; Y02E 50/15; Y02E 50/30
USPC ........... 34/327, 343, 348, 357, 358, 407, 408, 34/412, 413, 435, 436, 443, 482, 483, 485, 34/513, 514, 591, 592, 79, 82, 131, 132, 34/145, 165, 168, 169; 110/225
See application file for complete search history.

(56) References Cited

U.S. PATENT DOCUMENTS 2,286,309 A  *  6/1942  Rowen .......................... 110/225
4,347,156 A      8/1982  Lombana et al.
(Continued)

FOREIGN PATENT DOCUMENTS

EP    2017325 A2     1/2009
EP    2189512 A1     5/2010
WO    2005056723 A1  6/2005

*Primary Examiner* — Jiping Lu
(74) *Attorney, Agent, or Firm* — Renner Kenner Greive Bobak Taylor & Weber

(57) ABSTRACT

A device for drying and torrefaction of at least one carbon-containing material flow in a multiple-hearth furnace includes a drying zone, a torrefaction zone, a heat exchanger for heating the drying gas flow, the discharge point of the drying zone being connected via the heat exchanger to the infeed point of the drying zone; and a combustion assembly, wherein the discharge point of the torrefaction zone is connected via the combustion assembly and the heat exchanger to the infeed point of the torrefaction zone, wherein a torrefaction gas flow discharged via the discharge point of the torrefaction zone is combusted in the combustion assembly and the resulting exhaust gas is used in the heat exchanger to heat the drying gas flow and is fed to the torrefaction zone, wherein the drying zone and the torrefaction zone comprise two separate gas circulations.

22 Claims, 1 Drawing Sheet

(51) Int. Cl.
*C10L 5/40* (2006.01)
*C10L 9/08* (2006.01)
*F26B 17/00* (2006.01)
*F26B 23/02* (2006.01)
*F27B 9/18* (2006.01)
*F26B 21/04* (2006.01)
*F26B 21/14* (2006.01)

(52) U.S. Cl.
CPC ............... *C10L 9/083* (2013.01); *F26B 17/003* (2013.01); *F26B 21/04* (2013.01); *F26B 21/14* (2013.01); *F26B 23/022* (2013.01); *F26B 2200/02* (2013.01); *Y02E 50/14* (2013.01); *Y02E 50/15* (2013.01); *Y02E 50/30* (2013.01)

(56) References Cited

U.S. PATENT DOCUMENTS

| | | | |
|---|---|---|---|
| 5,237,757 A * | 8/1993 | Wiedmann et al. | 34/513 |
| 8,276,289 B2 * | 10/2012 | Causer | 34/90 |
| 2009/0093555 A1 * | 4/2009 | Stites et al. | 518/702 |
| 2010/0083530 A1 | 4/2010 | Weisselberg et al. | |
| 2010/0101141 A1 * | 4/2010 | Shulenberger et al. | 44/589 |
| 2010/0223839 A1 * | 9/2010 | Garcia-Perez et al. | 44/313 |
| 2010/0242351 A1 | 9/2010 | Causer | |
| 2011/0173888 A1 * | 7/2011 | Hitchingham et al. | 48/209 |
| 2012/0266485 A1 * | 10/2012 | Abraham et al. | 34/386 |
| 2012/0266531 A1 * | 10/2012 | Hitchingham et al. | 44/505 |

* cited by examiner

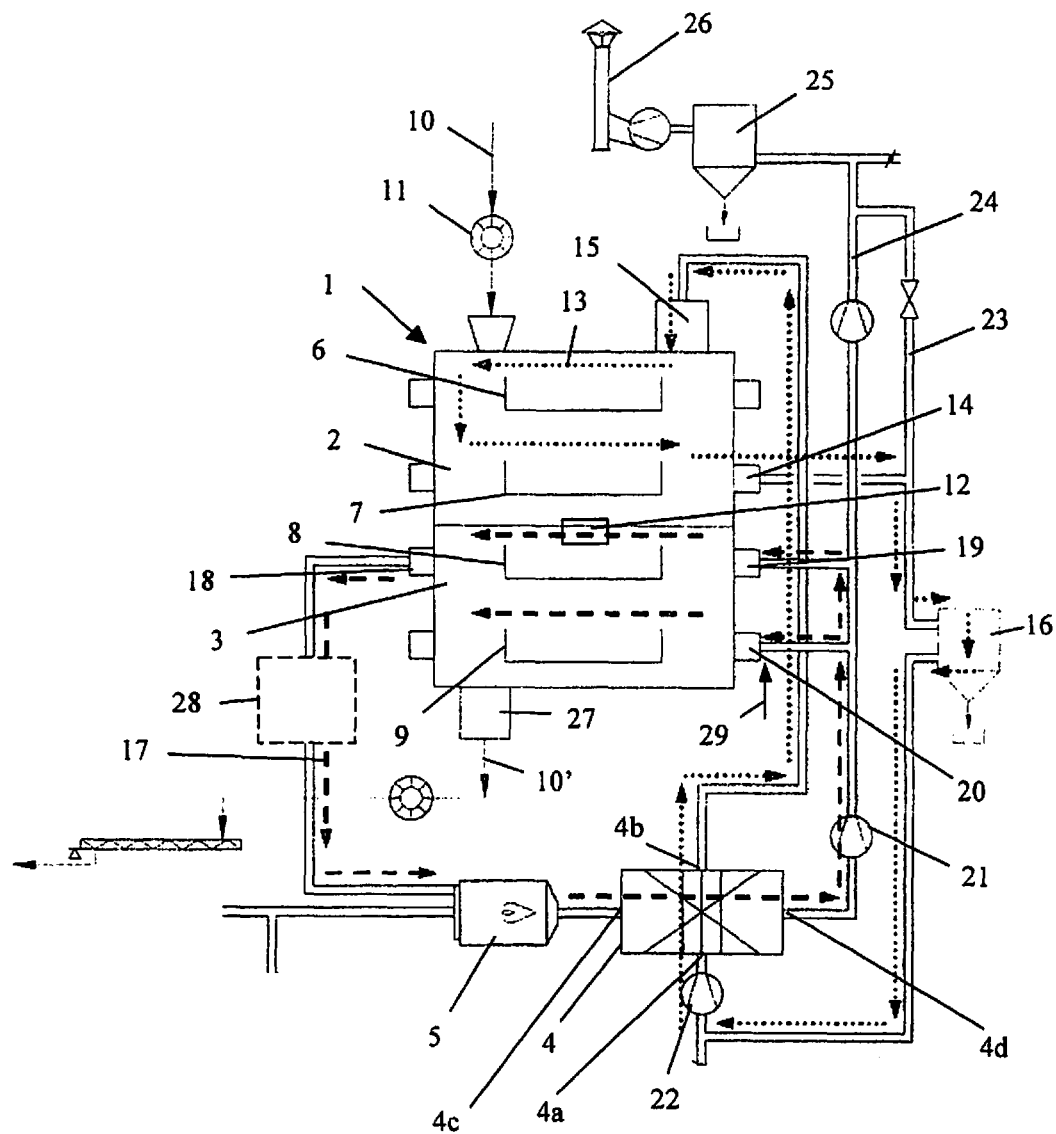

DEVICE AND METHOD FOR THE DRYING AND TORREFACTION OF AT LEAST ONE CARBON-CONTAINING MATERIAL FLOW IN A MULTIPLE HEARTH FURNACE

FIELD OF INVENTION

The invention relates to a device and a method for the drying and torrefaction of at least one carbon-containing material flow in a multiple-hearth furnace.

BACKGROUND OF THE INVENTION

Torrefaction is the thermal treatment of biomass in the absence of air at relatively low temperatures from 250° to 300° C. by pyrolytic decomposition.

U.S. Pat. No. 4,347,156 discloses a method for reactivating active carbon in a multiple-hearth furnace, upstream of which there is a drying zone. In said method, a gas flow is diverted from the multiple-hearth furnace and fed to an afterburner for combustion. The exhaust gas that evolves is fed to the drier, which can be operated either as a direct contact-type or as an indirect contact-type heat-exchanger.

Another device for torrefaction is disclosed in WO 2005/056723 A1. In this specification, gases withdrawn from the torrefaction stage are also fed to the drier or recirculated as hot gas into the torrefaction zone.

A device for the decomposition of biomass and for producing a fuel gas is furthermore known from EP 2 017 325 A2; here, the biomass is dried in a drying zone and degassed in a torrefaction zone. Finally, the material so treated is first comminuted and then fed to a pyrolysis stage. Part of the drying gas containing water vapour is discharged from the drier and heated in a heat exchanger and then fed at least partially to the drier again.

US 2010/0083530 A1 describes a method and an installation for the torrefaction of cellulosic material in an inert atmosphere. The material to be treated is fed to a processing chamber comprising a plurality of trays and after treatment is discharged as torrefied material. A steam-laden exhaust gas is discharged from the processing chamber and partially fed via a condenser to a burner, the hot exhaust gas of which is used to heat the remaining part of the steam-laden exhaust gas before the heated remaining part of the steam-laden exhaust gas is recycled to the processing chamber.

SUMMARY OF THE INVENTION

The invention addresses the problem of making the device and the method for drying and torrefaction of at least one carbon-containing material flow more efficient.

According to the invention that problem is solved by the features of claims 1 and 7.

The device according to the invention for drying and torrefaction of at least one carbon-containing material flow in a multiple-hearth furnace substantially comprises
a drying zone, which comprises a feed device for feeding a carbon-containing material flow, a discharge point for discharging a drying gas flow containing water vapour and an infeed point for recycling at least a part of the drying gas flow,
a torrefaction zone for degassing the material flow dried in the drying zone, which comprises a discharge point for discharging a torrefied material flow, at least one infeed point for an exhaust gas and a discharge point for a torrefaction gas flow,
a heat exchanger for heating the drying gas flow, the discharge point of the drying zone being connected via the heat exchanger to the infeed point of the drying zone,
a combustion assembly, wherein the discharge point of the torrefaction zone is connected via the combustion assembly and the heat exchanger to the infeed point of the torrefaction zone,
wherein a torrefaction gas flow discharged via the discharge point of the torrefaction zone is combusted in the combustion assembly and the resulting exhaust gas is used in the heat exchanger to heat the drying gas flow and is fed to the torrefaction zone,
wherein the torrefaction gas flow discharged from the torrefaction zone is combusted and heated in the combustion assembly and the resulting exhaust gas is cooled in the heat exchanger to the torrefaction temperature and is fed to the torrefaction zone,
wherein the drying zone and the torrefaction zone comprise two separate gas circulations.

In the method according to the invention for drying and torrefaction of at least one carbon-containing material flow in a multiple-hearth furnace, the biomass is dried in a drying zone by means of a drying gas flow and subsequently torrefied in a torrefaction zone. In the process, part of the drying gas flow containing water vapour is discharged from the drying zone and heated in a heat exchanger and then at least partially returned to the drying zone. Furthermore, part of a torrefaction gas flow evolving in the torrefaction zone is discharged from the torrefaction zone and fed to a combustion assembly for combustion, wherein the resulting exhaust gas is used to heat the drying gas flow in the heat exchanger and is introduced into the torrefaction zone. In this process, the torrefaction gas flow discharged from the torrefaction zone and combusted in the combustion assembly is heated, and the resulting exhaust gas is cooled in the heat exchanger to the required torrefaction temperature and fed to the torrefaction zone. Furthermore, the drying zone and the torrefaction zone are operated with two separate gas circulations.

Unlike the methods previously known from practice, it is not the torrefaction gas but the exhaust gas evolving during the combustion of the torrefaction gas in a combustion assembly that is introduced into the torrefaction zone. The exhaust gas thus has a completely different composition, which contains no volatile or condensable constituents and thus promotes the mass transfer during torrefaction. By combusting the volatiles arising during the torrefaction, the exhaust gas is enriched with $CO_2$ and $H_2O$ vapor before it is introduced into the torrefaction zone. $CO_2$ and $H_2O$ vapor are thermal radiation active gas components and promote the heat transfer in the torrefaction zone and increase the efficiency of the torrefaction.

By separating the two gas circulations, the energy advantage arising from the afterburning of the torrefaction gas flow and the use of the resulting heat to heat the drying gas flow can be exploited. Furthermore, the drying is especially efficient if the drying gas flow is not mixed with the exhaust gases of the torrefaction zone and the afterburning. A further improvement can be achieved particularly if the water vapour-containing drying gas flow is superheated in the heat exchanger.

Furthermore, only one heat exchanger is required for the two gas flows introduced into the drying zone and torrefaction zone, and both gas flows flowing through the heat exchanger are subsequently used in the multiple-hearth furnace. This produces an especially efficient drying and torrefaction of a carbon-containing material flow.

Further embodiments of the invention are the subject matter of the subsidiary claims.

According to a preferred embodiment of the invention, the drying zone and/or the torrefaction zone each consist of a plurality of hearths arranged one above the other. What are known as rabble arms, for example, are used as transport means. Furthermore, a mechanical transfer device can be provided between the drying zone and the torrefaction zone for transferring the dried, carbon-containing material flow; it is preferably of gas-tight construction in order to prevent mixing of the two gas circulations.

Furthermore, it has proved to be particularly efficient to operate the drying zone cocurrently and the torrefaction zone countercurrently (material flow/gas flow).

The temperature of the carbon-containing material flow during transfer into the torrefaction zone is expediently less than 150° C.

In the trials forming the basis of the invention, it has proved advantageous for the amount of steam recycled in the drier circulation to so large that an inert atmosphere having an oxygen content of <10%, preferably <8% develops. Furthermore, the amount of exhaust gas recycled in the torrefaction circulation should be so large that an inert atmosphere having an oxygen content of less than 10%, preferably less than 8%, can be set.

In addition, it is advantageous for the temperature of the recycled exhaust gas in the torrefaction zone to be more than 300° C. and for the temperature of the recycled drying gas flow to be set within the range from 150° C. to 300° C., preferably in the range from 200° C. to 300° C.

Control of the residence time of the material in the two zones can be effected by measuring the temperature and/or the gas flow and/or the gas amount and/or the pressure in the drying zone and/or the torrefaction zone.

The residence time in the drying zone and torrefaction zone can be adjusted by changing the number of hearths, by reducing hearth areas, by changing the design and the number of transport devices (for example, rabble arms and rabble teeth) or by varying the speed of rotation of transport devices (for example, rabble arms).

Further advantages and embodiments of the invention are explained in detail hereafter by means of the description and the drawing.

BRIEF DESCRIPTION OF THE DRAWING

FIG. 1 shows a block diagram of the device according to the invention for drying and torrefaction of at least one carbon-containing material flow in a multiple-hearth furnace.

DETAILED DESCRIPTION OF ONE OR MORE EMBODIMENTS OF THE INVENTION

The device for drying and torrefaction of at least one carbon-containing material flow substantially comprises a multiple-hearth furnace 1 having a drying zone 2 and a torrefaction zone 3, a heat exchanger 4 and a combustion assembly 5, which can be formed in particular by a burner or an internal combustion engine.

The drying and torrefaction zones 2, 3 are each provided with a plurality of hearths 6, 7, and 8, 9 respectively. The material to be treated, specifically a carbon-containing material flow 10, is fed in via a feed device 11 from above the drying zone 2. Transport of material on the hearths is effected by conventional transport devices, such as, for example, rotating rabble arms, which transport the material to inside or outside openings where the material falls onto the next lower hearth. Drying of the material flow 10 in the drying zone 2 is effected by means of a drying gas flow 13, which is represented in the drawing by dotted arrows. The heat exchanger comprises a first inlet 4a and a first outlet 4b connected thereto, as well as a second inlet 4c and a second outlet 4d connected thereto, the first inlet 4a being connected to a discharge point 14 of the drying zone 2 and the first outlet 4b being connected to an infeed point 15 of the drying zone 2, so that the water vapour-containing drying gas flow 13 is discharged via the discharge point 14, heated in the heat exchanger 4 and can be readmitted to the drying zone 2 via the infeed point 15.

The water vapour contained in the drying gas flow is expediently superheated in the heat exchanger 4, whereby an especially efficient drying can be achieved in the drying zone 2. Depending on the material flow, which can be, for example, wood, wood chips, agricultural products, such as straw, rice husks, nut shells, energy grasses, or waste from the food industry, (brewing, wine-making, sugar production), it may be expedient to provided a filter 16 between the discharge point 14 and the heat exchanger 4, in order to separate out the dust present in the drying gas flow, the result being that the efficiency of the heat exchanger 4 can be increased.

The torrefaction gas flow 17 (broken-line arrows) developing in the torrefaction zone 3 is discharged via a discharge point 18 and fed to the combustion assembly 5 for combustion; a condenser 28 can be inserted between the discharge point 18 and the combustion assembly 5. Before being fed into the combustion assembly 5, the torrefaction gas flow 17 discharged from the torrefaction zone 3 is then introduced into the condenser 28, in which the condensable constituents are at least partially precipitated and the non-condensable constituents are fed to the combustion assembly for combustion.

Further fuel and/or combustion air can of course by supplied to the combustion assembly 5. If the combustion assembly is in the form of an internal combustion engine, the energy of the torrefaction gas flow 17 can be partially converted by combustion into mechanical energy. The exhaust gas evolving in the combustion assembly 5, said gas also being indicated by broken-line arrows, is fed to the second inlet 4c of the heat exchanger 4 for indirect heating of the drying gas flow 13, is discharged via the second outlet 4d and fed to the torrefaction zone 3 via the infeed point 19 and/or 20. The two gas circulations are sustained via fans 21 and 22. Optionally, before it enters the torrefaction zone 3, the exhaust gas can be enriched with hot steam 29, in order to intensify the torrefaction and improve the exchange of heat and material.

For shutting down the installation and in an emergency, a flare stack can be provided in order to combust the torrefaction gas flow 17. Otherwise, excess amounts of drying gas flow 13 and torrefaction gas flow 17 are discharged via pipes 23 and 24 respectively, a filter 25 and a chimney 26.

The material flow 10' torrefied in the torrefaction zone 3 is discharged via a discharge point 27, in order then to be comminuted, briquetted or processed further in some other way.

Between the drying zone 2 and the torrefaction zone 3, a transfer device 12 is provided for transferring the dried, carbon-containing material flow from the drying zone 2 to the torrefaction zone 3. This transfer device is of gas-tight construction in order to prevent mixing of the drying gas flow 13 with the torrefaction gas flow 17.

The temperature of the torrefaction gas flow 17 recycled to the torrefaction zone 3 is preferably more than 300° C., whilst the temperature of the recycled drying gas flow 13 is adjusted in the range from 150° C. to 300° C., preferably in the range from 200° C. to 300° C.

So that the torrefaction takes place only in the torrefaction zone, the temperature of the carbon-containing material flow 10 during transfer to the torrefaction zone 3 should be less than 150° C.

Using suitable sensors in the drying and/or torrefaction zones 2 and 3, selectively the temperature and/or the gas flow and/or the amount of gas and/or the pressure can be measured and can be used to regulate the residence time of the carbon-containing material flow 10 in the two zones. The residence time in the drying and torrefaction zones 2 and 3 can be adjusted or adapted by changing the number of hearths, by reducing the effective hearth areas, or by varying the speed of rotation of transport devices.

The multiple-hearth furnace comprises transport devices for transporting the material flow 10, which are driven via a drive shaft, which is advantageously divided between the drying zone and torrefaction zone 2 and 3 and is equipped with a separate drive for each zone in order to be able to change the residence times of the carbon-containing material flow 10 in the two zones independently of one another by way of the respective speed of rotation.

By separating the two gas circulations, a very efficient drying of the material flow in the drying zone can take place with superheated steam. Recycling of the torrefaction gas flow 17 from the heat exchanger 4 back to the torrefaction zone 3 is also extremely advantageous in terms of energy. Overall, a very efficient method for drying and torrefaction of at least one carbon-containing material flow in a multiple hearth furnace is provided.

The invention claimed is:

1. A device for drying and torrefaction of at least one carbon-containing material flow in a multiple-hearth furnace, comprising
   a. a drying zone receiving a carbon-containing material flow, a discharge point for discharging a drying gas flow containing water vapour and an infeed point for recycling at least a part of the drying gas flow,
   b. a torrefaction zone for degassing the material flow dried in the drying zone, which comprises a discharge point for discharging a torrefied material flow, at least one infeed point for an exhaust gas and a discharge point for a torrefaction gas flow,
   c. a heat exchanger for heating the drying gas flow, the discharge point of the drying zone being connected via the heat exchanger to the infeed point of the drying zone,
   d. a combustion assembly, wherein the discharge point of the torrefaction zone is connected, via the combustion assembly and the heat exchanger for heating the drying gas flow, to the infeed point of the torrefaction zone,
   e. wherein a torrefaction gas flow discharged via the discharge point of the torrefaction zone is combusted in the combustion assembly and the resulting exhaust gas is used in the heat exchanger to heat the drying gas flow and is fed to the torrefaction zone,
   f. wherein the drying zone and the torrefaction zone comprise two separate gas circulations.

2. A device according to claim 1, characterised in that the heat exchanger comprises a first inlet and a first outlet connected thereto, as well as a second inlet and a second outlet connected thereto, the first inlet being connected to discharge point of the drying zone and the first outlet being connected to the infeed point of the drying zone, and furthermore the second inlet is connected via the combustion assembly to the discharge point of the torrefaction zone and the second outlet is connected to the infeed point of the torrefaction zone.

3. A device according to claim 1, characterised in that the drying zone and/or the torrefaction zone each comprise a plurality of hearths arranged one above the other.

4. A device according to claim 1, characterised in that a mechanical transfer device for transferring the dried, carbon-containing material flow is provided between the drying zone and the torrefaction zone.

5. A device according to claim 4, characterised in that the transfer device between the drying and torrefaction zone is of gas-tight construction in order to prevent mixing of the two gas circulations.

6. A device according to claim 1, characterised in that the multiple-hearth furnace comprises transport devices for transporting the material flow, which are driven via a drive shaft, which is divided between the drying zone and torrefaction zone and is equipped with a separate drive for each zone in order to be able to change the residence times of the carbon-containing material flow in the two zones independently of one another by way of the respective speed of rotation.

7. A device according to claim 1, characterised in that a condenser is inserted between the discharge point of the torrefaction zone and the combustion assembly.

8. A device according to claim 1, characterised in that the combustion assembly is formed by a burner or an internal combustion engine.

9. A method for drying and torrefaction of at least one carbon-containing material flow in a multiple-hearth furnace, wherein
   a. the biomass is dried in a drying zone by means of a drying gas flow and is subsequently torrefied in a torrefaction zone,
   b. part of the drying gas flow containing water vapour is discharged from the drying zone and heated in a heat exchanger and then at least partially recycled to the drying zone,
   wherein
   c. part of a torrefaction gas flow evolving in the torrefaction zone is discharged from the torrefaction zone and fed to a combustion assembly for combustion, wherein the resulting exhaust gas is used to heat the drying gas flow in the heat exchanger and is introduced into the torrefaction zone, and
   d. the drying zone and the torrefaction zone are operated with two separate gas circulations.

10. A method according to claim 9, characterised in that the drying zone is operated cocurrently.

11. A method according to claim 9, characterised in that the torrefaction zone is operated countercurrently.

12. A method according to claim 9, characterised in that the temperature of the carbon-containing material flow during transfer into the torrefaction zone is less than 150° C.

13. A method according to claim 9, characterised in that the drying gas flow in the gas circulation is filtered.

14. A method according to claim 9, characterised in that the water vapour-containing drying gas flow is superheated in the heat exchanger.

15. A method according to claim 14, characterised in that the amount of steam recycled in the drier circulation is so large that an inert atmosphere having an oxygen content of <10%.

16. A method according to claim 9, characterised in that the amount of exhaust gas introduced into the torrefaction zone so large that an inert atmosphere having an oxygen content of <10% is set in the torrefaction zone.

17. A method according to claim 9, characterised in that the temperature of the exhaust gas introduced into the torrefaction zone is more than 300° C. and the temperature of the recycled drying gas flow is set within the range from 150° C. to 300° C.

18. A method according to claim 9, characterised in that exhaust gas is enriched with hot steam before it enters the torrefaction zone.

19. A method according to claim 9, characterised in that before being fed into the combustion assembly, the torrefaction gas flow discharged from the torrefaction zone is introduced into a condenser, in which the condensable constituents are at least partially precipitated and the non-condensable constituents are combusted in the combustion assembly.

20. A method according to claim 9, characterised in that the torrefaction gas flow discharged from the torrefaction zone is combusted in the combustion assembly and is partially converted into mechanical energy.

21. A method according to claim 9, characterised in that in the drying zone and/or torrefaction zone the temperature and/or the gas flow and/or the gas amount and/or the pressure are measured and used for controlling the residence time of the material in the two zones.

22. A method according to claim 9, characterised in that the residence time in the drying zone and torrefaction zone is adjusted by changing the number of hearths, by reducing hearth areas, by changing the design and the number of transport devices or by varying the speed of rotation of transport devices.

* * * * *